Patented Sept. 15, 1936

2,054,283

UNITED STATES PATENT OFFICE 2,054,283

FACTIS AND PROCESS OF MAKING SAME

Carleton Ellis, Montclair, N. J.

No Drawing. Application June 13, 1935,
Serial No. 26,513

5 Claims. (Cl. 106—23)

This invention relates to a type of factis which preferably is readily soluble in various hydrocarbon solvents such as aromatic or aliphatic hydrocarbons or mixtures of these, mineral spirits, and the like.

The object preferably is to make a soluble product for use in various ways as such and particularly for incorporation in rubber, rubber cements and solutions, linoleum, paints and varnishes, plastics, and the like.

Glyceride oils such as cottonseed or corn oil react vigorously with sulphur chloride forming a gelatinous or rubbery compound known as factis, the product so obtained being ordinarily substantially insoluble in hydrocarbon solvents. As a result such insoluble factis is used, if at all, mainly in compounding with rubber in making various rubber compositions.

The present invention contemplates the production of a much more soluble form of factis which may be more readily incorporated with various solutions and which also may have a more powerful solvent action on substances such as rubber so that a better blending effect is secured.

As an illustration of the oil material which I find suitable for this purpose, I prefer jojoba oil, which is an oil extracted from the seeds or beans of *Simmondsia Californica*, that reacts with, say, 15 to 25 per cent by weight of sulphur chloride preferably when dissolved in a suitable hydrocarbon solvent to form solutions requiring only to have any free acidity removed to render them adaptable for use in various ways.

In this way I may produce a factis soluble in hydrocarbon oils in substantially all proportions. From solutions so obtained a varnish may be prepared containing jojoba oil factis. Likewise rubber and linoleum compositions containing the said factis may be prepared. Among various other uses are application as a paint or coating for cement and concrete, as a core oil for foundry use, in making fly paper compositions and adhesive coatings for banding fruit trees and the like, also for making compositions similar to bird lime; still other applications are in the preparation of adhesive tape, as a softening agent in the milling of rubber, in the making of chewing gum base, such for example as that used in the production of so-called bubble gum, as plasticizers and cements for various purposes, as a road binder, with or without other binding agents, for making roofing compositions, artificial shingles, tiles, and the like, tar paper, and so forth. The factis further may be used for various waterproofing purposes, for pitching casks, and in general for those applications where light colored pitches and the like would be needed. It may be noted at this point that the jojoba oil factis is comparatively light in color, depending to some extent upon the character of the oil obtained from the seed, but in general a light yellow or amber colored product is produced by treatment with sulphur chloride.

One method whereby I may obtain such a factis is to dissolve jojoba oil in about an equal volume of benzol and to this solution add sulphur chloride equal to 9–10 per cent of the volume of jojoba oil. The ingredients are thoroughly mixed and allowed to stand until reaction is completed. The mixture changes in physical characteristics from a light, mobile liquid to a thick, viscous liquid. Evaporation of the solvent, by any convenient means, yields a rubber-like, sticky, light amber colored, tasteless mass, substantially free of acidity and soluble in various hydrocarbon solvents. In place of benzol, a low-boiling petroleum hydrocarbon solvent, such as aviation gasoline, may be employed.

Although a large excess of sulphur chloride may be used, and a factis obtained which is soluble in hydrocarbon solvents, I prefer to employ only sufficient sulphur chloride to react with the active components of jojoba oil. This quantity of sulphur chloride will vary somewhat with the sample of oil undergoing treatment, but the requisite quantity may be readily determined by experiment. Although an excess of sulphur chloride is not objectionable from the standpoint of the properties of the factis obtained, nevertheless sulphur chloride is somewhat difficult to completely remove from the product, and its presence may be objectionable in many instances, e. g., in the preparation of chewing gum. Furthermore, the application of a large proportion of sulphur chloride may result in a darkening or discoloring of the factis.

In some instances it may be preferable to treat jojoba oil with sulphur chloride in the absence of a solvent. In such cases sulphur chloride may be incorporated with the oil by vigorous agitation. After reaction is complete, the mixture which changes to a plastic rubbery-like mass is freed of hydrogen chloride (formed during reaction) by washing with hot water, and then drying. Factis made in this manner is generally not so readily soluble in petroleum hydrocarbons and therefore in the preferred method reaction is carried out in the presence of a solvent.

The following examples will serve to illustrate my invention.

*Example 1.*—To 55 volumes of jojoba oil, dissolved in 50 volumes of benzol, were added 5 volumes of sulphur chloride. (This represents about 18 per cent by weight of sulphur chloride based on the jojoba oil employed.) After thorough agitation the mixture was allowed to stand overnight. The solvent then evaporated by carefully heating. The thick, sticky, gummy, rubber-like residue was light amber in color, and soluble in solvents such as gasoline, a grade of petroleum naphtha called Varsol, lubricating oils, benzol, xylene, and hydroformed petroleum distillates.

*Example 2.*—A 15 per cent solution of the factis in hydro naphtha (boiling 75°–100° C.) was employed to impregnate paper and cotton cloth. Both the paper and cloth was impervious to water even though allowed to remain in contact with this liquid for several days.

*Example 3.*—An adhesive tape was made by impregnating a strip of cotton cloth with a 50 per cent solution of jojoba factis in benzol. The strip, after evaporation of the solvent, was extremely sticky, and could be employed as a binding tape, as for example, in making electrical connections. Such adhesive-coated strips may also be employed for banding fruit trees.

*Example 4.*—The jojoba factis was incorporated in rubber cement in the following manner: 0.5 part of the factis was dissolved in 11 parts of benzol, and this solution incorporated with 11 parts of rubber cement (containing approximately 7 per cent rubber). The mixed composition could be employed in cementing together pieces of rubber.

*Example 5.*—A baking varnish was prepared as follows: 30 parts of a phenol-formaldehyde resin called Amberol 226 were added to 30 parts of tung oil and the mixture heated at 250°–260° C. for 15 minutes. After cooling to 150° C., 45 parts of Varsol were incorporated. When cold, 2.5 parts of a 30 per cent solution of mixed cobalt and lead naphthenate driers were added. 1.8 parts of jojoba factis, dissolved in 5 parts of xylene, were incorporated with 35 parts of the varnish and 10 parts of cellosolve added. The resulting composition, when applied to a steel surface and then baked for 60 minutes at 150° C., yielded a hard tough coating.

*Example 6.*—A varnish was prepared by adding 30 parts of rosin ester gum to 50 parts of tung oil and heating at 250°–260° C. for 15 minutes. When the temperature dropped to 150° C., 45 parts of Varsol were added. When cold, 2.5 parts of a 30 per cent solution of mixed cobalt and lead naphthenate driers were added. 0.17 part of jojoba factis was dissolved in 10 parts of Varsol, and this solution incorporated with 20 parts of the varnish. The resulting composition was applied to steel, and then baked for 60 minutes at 150° C. to yield a hard, tough coating.

*Example 7.*—The varnish composition containing jojoba factis, as prepared in Example 6, could be applied also to wood as a brushing varnish.

*Example 8.*—3.3 parts of jojoba factis were dissolved in 10 parts of Varsol and to this were added 1.6 parts of tung oil and 0.5 part of a 30 per cent solution of mixed lead and cobalt driers. This composition when applied to glass and baked for 30 minutes at 120° C. yielded a hard coating.

*Example 9.*—A similar composition was obtained by dissolving 3.75 parts of jojoba factis in 15 parts of Varsol, incorporating 3.75 parts of boiled linseed oil and 0.2 part of the solution of driers, applying this composition to glass and baking for 40 minutes at 125° C.

*Example 10.*—To prepare a linoleum containing jojoba factis dissolve 4 parts of the factis in 15 parts of Varsol and incorporate this solution with 32 parts of blown linseed oil. 40 parts of finely ground cork are incorporated with the mixture and the composition applied to a cloth backing by passage between hot rolls. Curing of the product is effected by heating at 120° C.

*Example 11.*—Treatment of 11 volumes of jojoba oil, dissolved in 10 volumes of aviation gasoline, with 1 volume of sulphur chloride gave, after removal of the solvent, a sticky, rubber-like product which was soluble in petroleum hydrocarbons. When the same volumes of oil and solvent were employed but twice as much sulphur chloride, the resulting product contained unreacted sulphur chloride which was difficult to remove. It was soluble in petroleum hydrocarbons.

*Example 12.*—Treatment of 11 volumes of cottonseed oil, in 10 volumes of aviation gasoline, with 1 volume of sulphur chloride gave a viscous oil, soluble in benzol and Varsol, but slightly soluble in lubricating oil. When 1.4 volumes of sulphur chloride were used, a dark colored, rubber-like mass, insoluble in petroleum hydrocarbons was obtained. Increasing the proportion of sulphur chloride to 2 volumes also yielded a black, rubber-like mass insoluble in petroleum hydrocarbons.

*Example 13.*—A light colored factis can be prepared from jojoba oil and sulphur chloride in the absence of a solvent in the following manner: To 50 volumes of jojoba oil is added 5 volumes of sulphur chloride and the ingredients thoroughly mixed. After standing overnight, hydrogen chloride formed by interaction of the two materials is removed by washing with warm water.

From the foregoing it will be seen that one phase of my invention consists in the preparation of an oil-soluble, light yellow to amber colored, rubber-like factis, particularly from jojoba oil. Another phase contemplates the application of such a body in the preparation of compositions such as adhesives, binders, waterproof materials, rubber compositions, or as a softening or plasticizing agent in which its adhesive and rubber-like properties are of special value. Still another aspect of my invention includes the use of this factis in the making of paints, linoleum, varnishes and the like. Such a factis is particularly applicable for the manufacture of varnishes and other similar products, the hardening or curing of which is dependent upon the application of heat, or a baking operation.

What I claim is:

1. A jojoba oil factis.
2. A varnish containing jojoba oil factis.
3. A rubber composition containing jojoba oil factis.
4. A linoleum containing jojoba oil factis.
5. The reaction product of jojoba oil with a sulphur chloride.

CARLETON ELLIS.